June 18, 1935.  C. SAURER  2,005,302
CAR WHEEL
Filed April 14, 1931
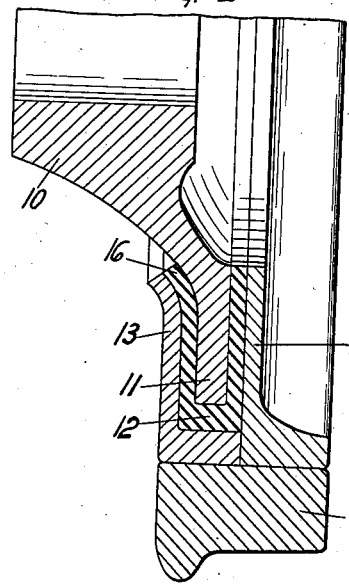
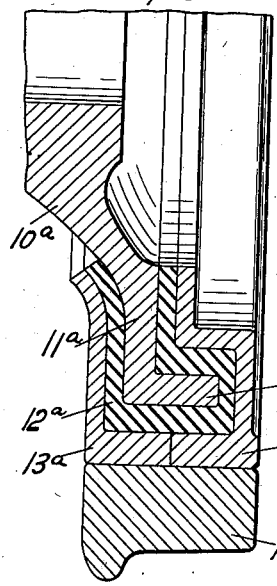
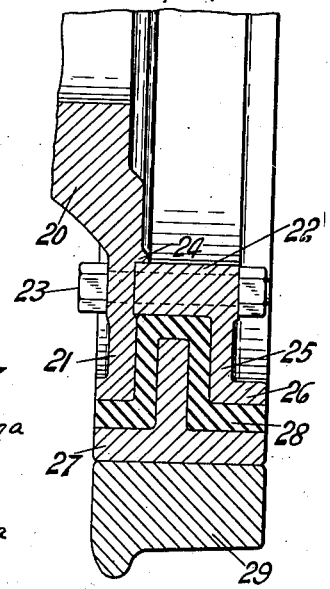
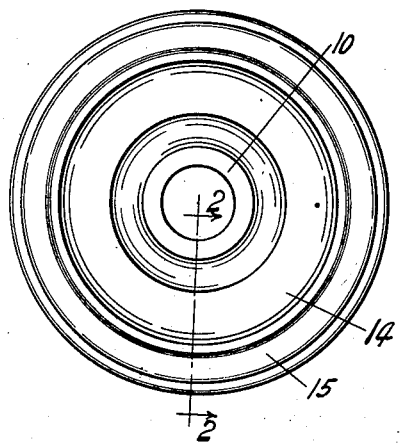
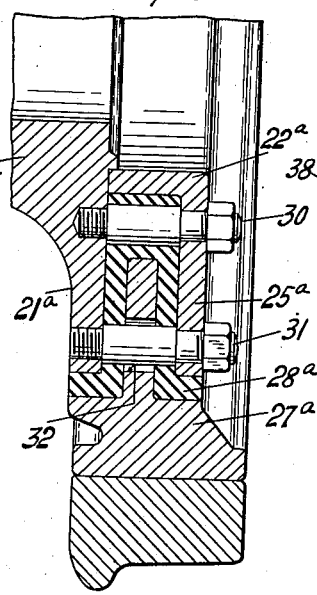
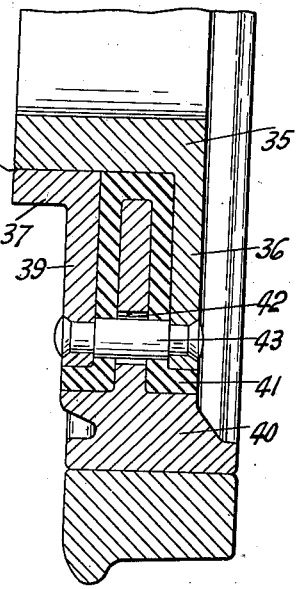
INVENTOR
CURT SAURER
BY Ely Barrow
ATTORNEYS Patented June 18, 1935

2,005,302

UNITED STATES PATENT OFFICE 2,005,302

CAR WHEEL

Curt Saurer, Akron, Ohio, assignor to The Firestone Tire & Rubber Company, Akron, Ohio, a corporation of Ohio Application April 14, 1931, Serial No. 529,972

9 Claims. (Cl. 295—11)

This invention relates to car wheels such as flanged car wheels for railway coaches, tramcars and the like, and more especially it relates to car wheels of the character mentioned comprising rubber to reduce noise and vibration of the car while the latter is moving.

Car wheels comprising rubber have been used with considerable success by railroads for sleeping cars and dining cars, but such car wheels heretofore provided have lacked lateral stability, that is, they lacked adequate rigidity in an axial direction with the result that there was excessive wear on the flanges of the wheels.

The chief objects of this invention are to provide a car wheel of the character mentioned that is relatively resilient in a radial direction and relatively rigid in an axial direction; and to provide means for determinately limiting relative movement of the wheel parts at least in one direction. Other objects will be manifest.

Of the accompanying drawing:

Figure 1 is a front elevation of a car wheel constituting one embodiment of the invention;

Figure 2 is a section on the line 2—2 of Figure 1; and

Figures 3, 4, 5, and 6 are radial sections of other embodiments of the invention.

Referring to Figures 1 and 2 of the drawing, 10 is the hub of a car wheel, 11 is an annular radial flange formed integral therewith, 12 is a cushion of resilient rubber composition upon the outer periphery thereof and the adjacent portions of both its lateral faces, 13 is a ring that is L-shaped in section and engages one lateral face of the cushion 12 and the outer periphery thereof, and 14 is a ring that engages the other lateral face of the cushion 12 and the adjacent edge of the ring 13, the outer peripheral faces of the rings 13, 14 being flush. The rubber cushion 12 is mounted in the position described while in plastic unvulcanized condition, and then is vulcanized so that it adheres strongly to the respective members that are in contact with it. A rail-engaging tire 15 formed with the usual side-flange is mounted upon the outer peripheral faces of the rings 13, 14, usually by shrinking it thereon.

Relative movement of the hub 10 and tire 15 in a radial direction is yieldingly resisted by the resistance to compression of the relatively small mass of rubber of the cushion 12 disposed between the outer periphery of the flange 11 and the underlying portion of the ring 12, and to a lesser extent by resistance to compression of the rubber in the curvature of the wheel flange, indicated at 16. Relative movement of the hub 10 and tire 15 in an axial direction is resisted by the resistance to compression of the relatively large masses of rubber of the cushion 12 on the lateral faces of the flange 11. Since the cushion 12 is vulcanized to the respective wheel members, relative movement thereof imposes some tension on the rubber of the cushion 12 and thereby assists in resisting relative movement of the said members, but the principal advantage of the vulcanization of the rubber to the metal is to hold the parts securely together and to prevent the entrance of water or foreign matter between the rubber and metal and to prevent relative movement between the surface of the rubber cushion and the adjacent metal surface. If such action were permitted rapid wearing away of the rubber surface would result.

Because of the fact that the mass of rubber of the cushion 12 between the periphery of the flange 11 and ring 13 is relatively small as compared to the masses of rubber between the lateral faces of the flange and adjacent rings, there is greater resistance to relative movement of the hub 10 and tire 15 in an axial direction than in a radial direction, and this differential of resistance is further increased by reason of the fact that relative axial movement of the wheel parts places an annular region of the cushion 12 under compression, whereas relative radial movement of the wheel parts compresses only that part of the cushion 12 that is between the periphery of the flange 11 and the ring 13 below the axis of the wheel. The arrangement provides a wheel that is relatively resilient in a radial direction and relatively rigid, yet having some resilience, in an axal direction.

In the embodiment of the invention shown in Figure 3, the hub 10ᵃ has an integral radial flange 11ᵃ that has a laterally extending peripheral portion or flange 17 that adds materially to the peripheral width of the hub flange 11ᵃ. The resilient rubber cushion 12ᵃ is disposed upon the lateral and peripheral faces of the flange 11ᵃ completely surrounding the flange 17 of the latter. An L-shaped ring 13ᵃ embraces one lateral face and about half the width of the peripheral face of the cushion 12ᵃ, and another ring 14ᵃ embraces the opposite lateral face of the cushion 12ᵃ including the part thereof on both sides of the flange 17, and the remainder of the peripheral face of the cushion. The cushion 12ᵃ is vulcanized to the respective metal parts that engage it, and the usual tire 15ᵃ is shrunk onto the outer peripheral surface of the rings 13ᵃ, 14ᵃ. The arrangement effects much greater radial rigidity than is present in the embodiment shown in Figures 1 and 2, and illustrates how the proportionate differential of resilience in radial and axial directions may be varied as desired.

Referring now to Figure 4 of the drawing, the wheel comprises a hub 20 formed with an annular radial flange 21, the perimeter of which is somewhat widened, and a wide ring 22 of somewhat smaller diameter than the flange 21 and secured to the latter by an annular series of bolts 23, the ring 22 seating about a concentric, laterally projecting rib 24 formed on the flange 21. The ring 22 is formed with a radial flange 25 that is parallel to and spaced apart from the flange 21, and the flange 25 has its outer peripheral portion widened by means of a circumferential offset portion 26. Circumscribing the flange 21 and flange 25 of the ring 22 is a ring 27 that is T-shaped in section, the vertical portion thereof extending inwardly and being positioned between said flanges 21 and 25 and spaced apart from both of them, and the horizontal portion of the ring being spaced from the outer periphery of the said flanges. Mounted between the flanges 21, 25, and the adjacent vertical and horizontal portions of the ring 27 is an annular cushion of resilient rubber composition 28 that is vulcanized to the adjacent metal members of the wheel. A tire 29 of the usual flanged type is shrunk onto the outer periphery of the ring 27.

The embodiment of the invention shown in Figure 5 of the drawing is similar to that shown in Figure 4 except that it has greater radial resilience than the latter, which feature is the result of greater radial depth of the rubber cushion 28a and less transverse surface thereof in engagement the outer peripheral surfaces of the flanges 21a, 25a and inner peripheral surface of the ring 27a. The ring 22a is secured to the flange 21a by means of a circumferential series of stud bolts 30 that are threaded into the flange 21a and extend through the intervening rubber cushion 28a and through the flange 25a of the ring 22a, and a second circumferential series of stud bolts 31 that are threaded into the flange 21a and extend through the intervening rubber cushion 28a and vertical portion of the ring 27a, and through the flange 25a of the ring 22a, both sets of bolts being provided with nuts set up against the outer face of the flange 25a.

The vertical portion of the ring 27a is formed with respective apertures 32 which are somewhat larger than the stud bolts 31 and through which the latter extend, the arrangement providing a fixed limit for relative radial movement of the wheel parts.

In the embodiment of the invention shown in Figure 6, the wheel comprises a hub 35 formed with a radial flange 36, a ring 37 that circumscribes said hub and is permanently secured thereto as by welding at 38, said ring being formed with a radial flange 39 that is parallel to the flange 36 and spaced apart therefrom. Between the flanges 36, 39 is the vertical portion of a T-shaped ring 40 that is similar to the ring 27a, and a cushion of resilient rubber 41, similar to the cushion 28a is similarly mounted with relation to the flanges 36, 39, and the ring 40. The vertical portion of the ring 40 is formed with a circumferential series of apertures 42 and extending through said apertures are respective spacer members 43 of smaller size than the apertures, said spacer members extending through the rubber cushion on each side of the vertical portion of the ring 40 and having their ends secured to the respective flanges 36, 39. The spacer members 43 may be riveted, as shown in the drawing, after the vulcanization of the rubber cushion. The arrangement imparts rigidity to the peripheral regions of the flanges 36, 39, and also limits the relative movement of the wheel parts in a radial direction.

Bonding of the rubber to the adjacent metal parts during vulcanization affords a unitary wheel construction having a high factor of safety and better adapted to withstand relative movement of the hub and tire portions of the wheel. The invention provides readily for varying the proportionate resilience of car wheels in radial and axial directions, whereby the desired resilience may be obtained. By making the wheel relatively rigid in an axial direction, excessive wear on the tire flange of the wheel is avoided.

It may be found desirable to finish the bore of the hub and the periphery of the tire roughly prior to vulcanization. In this event after the rubber cushion has been cured in place the hub and tire are suitably clamped against relative movement and the bore of the hub and peripheral surface of the tire accurately machined.

Other modifications are possible within the scope of the appended claims which are not limited wholly to the specific construction shown and described.

What is claimed is:

1. In a car wheel, the combination of a hub formed with a radial flange, a concentric ring secured to said hub flange, and formed with a flange parallel to and spaced therefrom, a second ring circumscribing the aforesaid flanges, and formed with an inwardly extending flange disposed between the two first mentioned flanges, a cushion of resilient rubber so mounted between said flanges and rings as yieldingly to resist relative movement of said members in a radial and in both axial directions, said cushion also extending between the circumscribing part of said second ring and the outer periphery of said flanges, and means for determinately limiting relative radial and axial movement of the members, said means being disposed radially intermediate the inner and outer periphery of said flanges.

2. In a car wheel, the combination of a hub formed with a radial flange, a ring mounted concentrically thereon and formed with a flange disposed parallel to and spaced apart therefrom, a second ring circumscribing the aforesaid flanges and formed with an inwardly extending flange disposed between and spaced from the aforesaid flanges, said flanges being of considerable axial thickness and manifesting substantial resistance to flexure or distortion in response to stresses set up therein, a cushion of resilient rubber so mounted between said rings and flanges as yieldingly to resist relative radial and axial movement of the parts, and a spacer member secured to the two outer flanges of the assembly and extending through the intervening cushion and ring-flange, the latter being formed with an aperture of greater diameter than the spacer member to accommodate the same, whereby relative radial movement of the parts is determinately limited, said spacer member also being operable to restrain said flanges against axial movement toward and away from each other.

3. A wheel comprising a hub member composed of two sections disposed endwise and each having a wide annular flange, a felloe member having a wide annular flange between said hub flanges, and a ring of rubber filling the space opposite the sides and periphery of said felloe flange and cured therein under pressure.

4. A metal wheel comprising a hub member and a felloe member provided with widely overlapping flanges, an annular rubber member interposed between said flanges and cured thereto and a rim member shrunk on said felloe member.

5. A wheel comprising a hub member, a felloe member, one of said members being composed of two sections disposed endwise and each having a wide annular flange, and the other of said members having a wide annular flange between the flanges of said sections, rubber interposed between the flanges of said members, said rubber completely isolating, and constituting the sole connection between said hub and felloe members, and an annular member tightly fitting the two sections of said sectional member for holding them together, said annular member holding said sections together with said rubber under a predetermined degree of elastic deformation.

6. In a resilient wheel, a hub member having a substantially radially disposed clamp ring face and an abutment face disposed inwardly of said clamping face; a ring-like element operably associated with said hub member and having a substantially radially disposed clamping face, said element terminating at its inner periphery in an axially directed cylindrical flange, same element being disposed with said flange in frictional engagement with said abutment face and with its clamping face spaced from the clamping face of said hub member to provide a substantially parallel-walled annular recess therebetween, a ring-like rim member circumscribing said hub member and element and having an inwardly directed flange disposed between the flanges of said hub member and element, a body of resilient material disposed between said flanges and providing a yielding connection therebetween; and a plurality of circularly spaced stabilizing pins extending through all of said flanges and disposed radially intermediate the clamping faces of the latter, said stabilizing pins being secured to the flanges of said hub member and element and constituting the sole connection therebetween, said stabilizing pins having means provided thereon for preventing axial movement of the outer regions of said hub member and element flanges toward and away from each other.

7. The resilient wheel described in claim 6, wherein said stabilizing pins extend through oversized openings in said rim member flange with a predetermined degree of lost-motion, for determinately limiting relative radial deflection of said rim and hub members against the action of said resilient material.

8. The resilient wheel described in claim 6, wherein said stabilizing pins are encased in said resilient material and are provided with shoulders frictionally engaging the clamping faces of said hub and element flanges.

9. The resilient wheel described in claim 6, together with a second set of stabilizing pins disposed inwardly of said first stabilizing pins but outwardly of said cylindrical flange, and operable to maintain the latter in frictional engagement with said abutment face.

CURT SAURER.